M. C. JENNINGS.
ROPE FASTENER.
APPLICATION FILED OCT. 8, 1908.

960,333.

Patented June 7, 1910.

Witnesses:
A. A. Olson
W. S. Smith

Inventor:
Milo C. Jennings
by
Joshua R. H. Potts,
Atty.

UNITED STATES PATENT OFFICE.

MILO C. JENNINGS, OF CHICAGO, ILLINOIS, ASSIGNOR OF ONE-FIFTH TO DUGALD McMILLEN, ONE-FIFTH TO KENNETH E. WALSH, AND ONE-FIFTH TO HARRY J. CUNNINGHAM, ALL OF CHICAGO, ILLINOIS.

ROPE-FASTENER.

960,333.

Specification of Letters Patent. Patented June 7, 1910.

Application filed October 8, 1908. Serial No. 456,784.

*To all whom it may concern:*

Be it known that I, MILO C. JENNINGS, a citizen of the United States, residing at Chicago, county of Cook, and State of Illinois, have invented certain new and useful Improvements in Rope-Fasteners, of which the following is a specification.

My invention relates to rope fasteners or grips.
The object of my invention is to provide a device of the character mentioned, by means of which the ends of a rope, line or the like, may be readily and easily united, and whereby the slack of the line may be quickly taken up at any time, and further, a fastener which will effectually hold the rope or line in whatever position it may have been adjusted.

A further object of my invention is to provide a device of the character mentioned, which will be of such construction as to be especially applicable as a guy rope fastener or adjuster for tents, as a fastener for the halyards of a sail-boat, or as a fastener for wagon cover ropes, clothes-lines, etc., where a speedy yet firm hitch or grip is required without injury or damage to the rope in use.

A still further object of my invention is to provide a device of the character mentioned, which will be of the highest possible efficiency, and one which will be strong and durable, simple of construction, hence, of low cost to manufacture.

Figure 1:
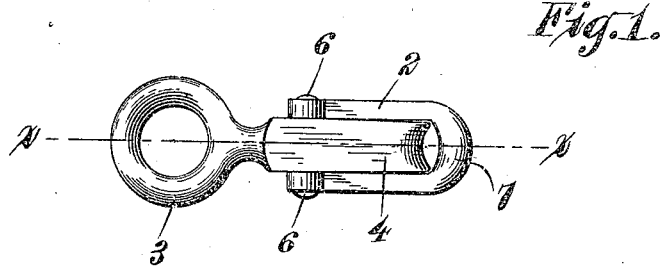
Figure 2:
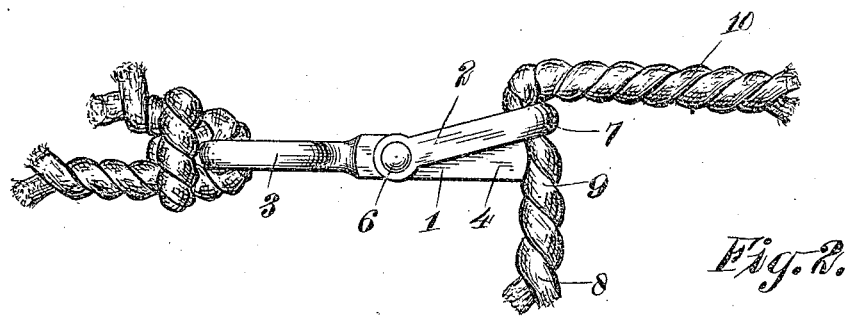
Figure 3:
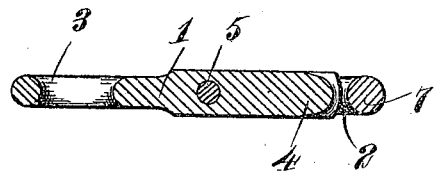

With these objects in view, my invention consists in a fastener characterized as above mentioned, and in certain details of construction and arrangement of parts all as will be hereinafter fully described, and particularly pointed out in the claim.
My invention will be more readily understood by reference to the accompanying drawings forming a part of this specification, and in which, Figure 1 is a top plan view of my device, Fig. 2 is a side elevation thereof showing the application of the same, and Fig. 3 is a longitudinal section taken on the line *x—x* of Fig. 1.

Referring now to the drawings, my invention is comprised in the body member 1 and a locking member 2 pivotally secured thereto. The member 1 is square in cross section and the outer end portion of the same is formed into a preferably circular eye 3 for the reception of a rope or line, as shown in Fig. 2. The inner end of the member 1 is concave and rounded, as clearly shown in Fig. 3. Said concave and rounded portion is made perfectly smooth so as to obviate any possibility of injuring or in any way damaging the rope used and extends from side to side of said member. The member 2 is U-shaped as shown, it being pivotally secured to the member 1, as before stated, by a pivotal pin 5, which extends entirely through said members, the extremities 6 thereof being preferably flattened, for obvious reasons. The member 2 is so positioned upon the member 1 that the bight 7 thereof is adapted to just pass the inner extremity of the member 1, said bight portion being preferably rounded, that is, is substantially circular in cross section, the surface thereof being made preferably smooth, so as not to damage, or in any way injure the rope or line used in the device. In use the end portion 8 of the rope 9 to be fastened, is inserted between the walls of the member 2. By drawing upon the end portion 10 of said rope, it is evident that said rope will be securely clamped between the extremity of the member 1 and the inside surface of the member 2. By this provision, the more tension applied to the ropes secured to the opposite ends of the fastener, the more securely and tightly will the rope 9 be clamped in the fastener. Hence, the secureness of the fastening of the rope in the fastener is in a direct ratio to the force applied to the ropes united, or in other words, the secureness of the fastening increases as the necessity for it.

Because of the form and the simplicity in construction of my device, it is obvious, especially to foundry-men or others with knowledge of foundry work, that my device may be readily cast from a gate pattern. By the use of such a pattern, twenty-four or more parts may be taken from the mold at one time, thereby making it possible to manufacture my device at an exceptionally low cost.

As before stated, my fastener will be especially applicable as a guy rope adjuster and fastener on tents, in which application, there will be a saving of at least one-third of the guy rope length, it being needless with my device to return said guy rope midway between the tent peg and the tent, which as is known, is necessary when employing the usual wooden block ordinarily used. Further my device will not swell in wet weather, thereby causing the binding of the ropes within the same, or it will not crack in dry weather, these being the foremost objections to guy rope blocks now in use. By providing my device with a galvanic coating, or the like, it will be protected against rusting or corrosion, hence, will obviate the possibility of my device becoming inoperative.

While I have shown what I deem to be the preferable form of my device, I do not wish to be limited thereto as there might be many changes made in the details of construction, without departing from the scope of my invention.

While I have designed my device with special reference to guy ropes, sail-boat halyards, wagon cover ropes, etc., it is understood that the same may be used in connection with any other rope to which it is applicable.

Having described my invention what I claim as new, and desire to secure by Letters Patent, is:

A rope fastener consisting of a straight body member of uniform square cross section and an integral ring upon one end thereof forming an eye, in combination with a U-shaped member, both extremities of said U-shaped member being pivotally secured to said body member in a plane with said ring, the extremity of said body opposite said eye being concave and rounded forming a smooth inwardly curved surface extending from side to side, and said groove extending a short distance upon opposite sides of the body the bight of said U-shaped member being adapted to just pass said inner extremity of said body member, and said bight portion being smooth and substantially circular in cross section, substantially as described.

In testimony whereof I have signed my name to this specification in the presence of two subscribing witnesses.

MILO C. JENNINGS.

Witnesses:
W. C. SMITH,
JANET E. HOGAN.